US012759192B2

(12) United States Patent
Massa et al.

(10) Patent No.: US 12,759,192 B2
(45) Date of Patent: Oct. 13, 2026

(54) METHOD FOR THE MEASUREMENT OF THE AMOUNT OF CEMENTITIOUS MATERIAL IN A CONCRETE MIXING TRUCK USING A RESONANT ELECTROACOUSTIC TRANSDUCER

(71) Applicants: GCP Applied Technologies Inc., Cambridge, MA (US); Massa Products Corporation, Hingham, MA (US)

(72) Inventors: Donald P. Massa, Scituate, MA (US); Dawn F. Stancavish, Marshfield, MA (US); Nathan A. Tregger, Northborough, MA (US); Mark F. Roberts, North Andover, MA (US); David F. Myers, Somerville, MA (US); Stephen P. Klaus, Waban, MA (US)

(73) Assignee: GCP APPLIED TECHNOLOGIES INC., Cambridge, MA (US)

(*) Notice: Subject to any disclaimer, the term of this patent is extended or adjusted under 35 U.S.C. 154(b) by 0 days.

(21) Appl. No.: 18/740,866

(22) Filed: Jun. 12, 2024

(65) Prior Publication Data

US 2024/0326289 A1 Oct. 3, 2024

Related U.S. Application Data

(62) Division of application No. 16/868,846, filed on May 7, 2020, now Pat. No. 12,049,023.
(Continued)

(51) Int. Cl.

| | |
|---|---|
| ***B28C 7/02*** | (2006.01) |
| ***B28C 5/08*** | (2006.01) |

(Continued)

(52) U.S. Cl.
CPC ............ *B28C 7/024* (2013.01); *B28C 5/0806* (2013.01); *B28C 5/388* (2013.01); *B28C 5/422* (2013.01);
(Continued)

(58) Field of Classification Search
CPC ....... B28C 7/024; B28C 5/0806; B28C 5/388; B28C 5/422; B28C 5/4272; G01N 29/02;
(Continued)

(56) References Cited

U.S. PATENT DOCUMENTS

| | | |
|---|---|---|
| 3,609,316 A | 9/1971 | Brosset et al. |
| 3,654,072 A | 4/1972 | Massa |

(Continued)

FOREIGN PATENT DOCUMENTS

| | | |
|---|---|---|
| DE | 4237543 A1 | 5/1994 |
| DE | 4437970 A1 | 5/1996 |

(Continued)

OTHER PUBLICATIONS

International Search Report and Written Opinion mailed Dec. 22, 2017 in corresponding PCT application No. PCT/US2017/056122.
(Continued)

*Primary Examiner* — Charles Cooley
(74) *Attorney, Agent, or Firm* — Nields, Lemack & Frame, LLC

(57) ABSTRACT

Method for measuring an amount of cementitious material in a concrete mixing truck using a resonant electroacoustic transducer by rotating the mixing drum so that a radiating surface of the electroacoustic transducer submerges in and then emerges from the cementitious material while measuring with an electronic circuit the driving point impedance magnitude of the resonant frequency $f_r$ and antiresonant frequency $f_a$, and calculating the activity of the electroacoustic transducer a plurality of times as the mixing drum
(Continued)

rotates. The calculated activities and the corresponding rotational angles, time values or both are used to determine a volume of cementitious material in the concrete mixing truck.

4 Claims, 11 Drawing Sheets

Related U.S. Application Data

(60) Provisional application No. 62/846,326, filed on May 10, 2019.

(51) Int. Cl.
*B28C 5/38* (2006.01)
*B28C 5/42* (2006.01)
*G01N 29/02* (2006.01)
*G01N 29/24* (2006.01)

(52) U.S. Cl.
CPC ........... *B28C 5/4272* (2013.01); *G01N 29/02* (2013.01); *G01N 29/24* (2013.01); *G01N 2291/02433* (2013.01)

(58) Field of Classification Search
CPC ......... G01N 29/24; G01N 2291/02433; G01N 2291/0232; G01N 2291/0251; G01N 2291/02809; G01N 29/348; G01N 29/42; G01N 29/028; G01N 2291/018
See application file for complete search history.

(56) References Cited

U.S. PATENT DOCUMENTS 3,739,327 A * 6/1973 Massa ....................... G01S 1/72 367/157
4,008,093 A 2/1977 Kitsuda et al.
5,527,387 A 6/1996 Andersen et al.
5,713,663 A * 2/1998 Zandberg .............. B28C 7/0454 366/8
5,895,116 A 4/1999 Kreinheder et al.
6,042,258 A 3/2000 Hines et al.
6,224,250 B1 5/2001 Kreinheder et al.
6,227,039 B1 5/2001 Te'eni
6,484,079 B2 11/2002 Buckelew et al.
6,611,755 B1 8/2003 Coffee et al.
7,033,321 B1 4/2006 Sarvazyan
7,134,320 B2 11/2006 Gysling et al.
7,165,464 B2 1/2007 Gysling et al.
7,343,820 B2 3/2008 Gysling et al.
7,363,800 B2 4/2008 Gysling
7,367,240 B2 5/2008 Gysling et al.
7,384,180 B2 6/2008 Jarvinen et al.
7,386,368 B2 6/2008 Andersen et al.
7,503,227 B2 3/2009 Davis et al.
7,571,633 B2 8/2009 Gysling et al.
7,972,436 B2 7/2011 Ou et al.
8,020,431 B2 9/2011 Cooley et al.
8,058,377 B1 11/2011 Goc-Maciejewska et al.
8,118,473 B2 2/2012 Cooley et al.
8,311,678 B2 11/2012 Koehler et al.
8,491,717 B2 7/2013 Koehler et al.
8,727,604 B2 5/2014 Cooley et al.
8,746,954 B2 6/2014 Cooley et al.
8,764,272 B2 7/2014 Hazrati et al.
8,764,273 B2 7/2014 Koehler et al.
8,818,561 B2 8/2014 Koehler et al.
8,858,061 B2 10/2014 Berman
8,960,990 B2 2/2015 Koehler et al.
8,989,905 B2 3/2015 Sostaric et al.
9,416,051 B2 8/2016 Kuhlman et al.
9,466,203 B2 10/2016 Jordan et al.
9,518,870 B2 12/2016 Verdino
9,550,312 B2 1/2017 Roberts et al.
9,625,891 B2 4/2017 Berman
9,952,246 B2 4/2018 Jordan et al.
10,183,418 B2 1/2019 Jordan et al.
10,363,684 B2 7/2019 Roberts et al.
11,312,039 B1 * 4/2022 Chapdelaine ........... B28C 5/422
11,860,131 B2 1/2024 Jack et al.
12,049,023 B2 * 7/2024 Massa ..................... B28C 7/024
12,625,111 B2 * 5/2026 Itou
2002/0015354 A1 2/2002 Buckelew
2002/0048212 A1 4/2002 Hill et al.
2004/0149172 A1 8/2004 Jardine et al.
2006/0039233 A1 2/2006 Farrington et al.
2007/0185636 A1 * 8/2007 Cooley ..................... B28C 7/12 701/50
2007/0192257 A1 8/2007 Amey et al.
2007/0266905 A1 11/2007 Amey et al.
2008/0027584 A1 1/2008 Andersen et al.
2008/0295741 A1 12/2008 Jeknavorian et al.
2008/0316856 A1 * 12/2008 Cooley ................. B28C 5/4231 366/142
2009/0037026 A1 * 2/2009 Sostaric .............. B28B 23/0031 700/265
2009/0158960 A1 6/2009 Andersen et al.
2009/0171595 A1 7/2009 Benegas
2011/0004332 A1 1/2011 Andersen
2011/0077778 A1 * 3/2011 Berman ................. G05B 15/02 700/265
2011/0320040 A1 * 12/2011 Koehler .................. B28C 5/422 700/265
2012/0016523 A1 1/2012 Koehler et al.
2013/0019235 A1 1/2013 Tamm
2013/0145967 A1 * 6/2013 Koehler .............. C04B 40/0032 524/4
2013/0192351 A1 * 8/2013 Fernald .................. G01N 29/02 73/61.49
2013/0238255 A1 9/2013 Cooley et al.
2014/0104972 A1 4/2014 Roberts et al.
2014/0107844 A1 * 4/2014 Koehler .................. B28C 7/026 700/265
2014/0297204 A1 10/2014 Biesak et al.
2015/0082862 A1 3/2015 Loose et al.
2015/0142362 A1 * 5/2015 Jordan ................ B01F 35/2214 702/96
2015/0355160 A1 12/2015 Berman
2016/0025700 A1 * 1/2016 Beaupré .................. B28C 5/422 73/32 R
2016/0355441 A1 * 12/2016 Tregger .............. C04B 40/0032
2017/0108421 A1 * 4/2017 Beaupre ................. G01N 11/14
2019/0072524 A1 * 3/2019 Loose ...................... G01N 9/24
2020/0173899 A1 * 6/2020 Biesak ................. G01N 33/383
2020/0217833 A1 * 7/2020 Davis .................. G01N 29/245
2020/0262105 A1 * 8/2020 Tregger .................. B28C 5/422
2020/0353645 A1 * 11/2020 Massa .................. G01N 29/028
2020/0402619 A1 * 12/2020 Tregger .................. B28C 7/024
2021/0035036 A1 * 2/2021 Tregger ........... G06Q 10/06313
2021/0333187 A1 * 10/2021 Roberts ................... B28C 5/422
2021/0394394 A1 * 12/2021 Datema ............ G06Q 10/06315
2022/0146440 A1 * 5/2022 Beaupre ............... G01N 23/083
2022/0388198 A1 * 12/2022 Datema ................. B28C 7/0418
2023/0150170 A1 * 5/2023 Beaupre ................. G01N 11/10 366/17
2024/0326289 A1 * 10/2024 Massa .................. G01N 29/028

FOREIGN PATENT DOCUMENTS

EP 0126573 A1 11/1984
EP 0901017 A2 3/1999
GB 1182590 A 2/1970
GB 2144240 A 2/1985
GB 2392502 A 3/2004
GB 2426347 A 11/2006
GB 2432675 A 5/2007
JP 2001-97749 A 4/2001
TW I224192 B 11/2004
WO 98/01739 A2 1/1998
WO 2007/060272 A2 5/2007
WO 2009/126138 A1 10/2009

(56) References Cited

FOREIGN PATENT DOCUMENTS

| | | | | |
|---|---|---|---|---|
| WO | 2009/114523 A2 | | 12/2009 | |
| WO | 2010/111204 A1 | | 9/2010 | |
| WO | 2013/059466 A1 | | 4/2013 | |
| WO | 2016/014923 A1 | | 1/2016 | |
| WO | 2017/099711 A1 | | 6/2017 | |
| WO | 2019/040621 A1 | | 2/2019 | |
| WO | WO-2019032820 A1 | * | 2/2019 | ............... B28C 5/42 |
| WO | WO-2024024306 A1 | * | 2/2024 | |

OTHER PUBLICATIONS

International Search Report and Written Opinion mailed Sep. 18, 2020 in corresponding PCT application No. PCT/US2020/031793.

* cited by examiner

METHOD FOR THE MEASUREMENT OF THE AMOUNT OF CEMENTITIOUS MATERIAL IN A CONCRETE MIXING TRUCK USING A RESONANT ELECTROACOUSTIC TRANSDUCER

This application is a divisional of U.S. patent application Ser. No. 16/868,846 filed May 7, 2020, which claims priority to U.S. Provisional Patent Application Ser. No. 62/846,326, filed May 10, 2019, the disclosures of which are incorporated herein by reference in their entireties.

FIELD OF THE INVENTION

This invention relates to apparatus and method for measurement and monitoring of physical properties of materials, such as liquids, and more particularly to acoustic instruments, methods, and systems that automatically measure air content in real-time within liquids, including concrete, mortar, or other hydratable cementitious mix suspensions using resonant electroacoustic transducers that have their radiating surfaces in contact with the liquid.

BACKGROUND OF THE INVENTION

It is often desirable to be able to continuously measure physical properties of liquids, such as air content. For example, it is well known in the concrete industry that the amount of air content in hydratable cementitious mix suspensions has a great effect on the mechanical integrity of the final structure in which the material was used. There is therefore a need to measure the air content in these materials, often in real-time, in order to enable the continual modification and control of this parameter from the time the wet cementitious mix is batched, while it is being transported, and when it is finally used at a worksite.

Electroacoustic systems have often been used to measure different physical properties of liquids. In most cases, these systems measured the speed of sound in the fluids, since this parameter often had a direct correlation to the properties desired to be monitored. For example, systems to monitor and control chemical processes in fluids by measuring the instantaneous speed of sound, and other sound transmission characteristics, such as attenuation, have been described.

It is also known in the art that electroacoustic devices can be used in instrumentation to sense air volume fraction in fluid such as concrete and mortar, which are suspensions (or slurries) that include a hydratable cementitious binder and aggregate used for making durable construction materials. In most cases, prior art systems required the accurate measurement of the speed of sound in the fluid to determine these properties. Other physical aspects of the fluids, such as density or bulk modulus, were also measured or estimated. These various physical properties were then entered into a complex mathematical formula in order to attempt to accurately compute the percentage of air in the liquids.

For example, a system where an acoustic signal is generated by at least one acoustic transmitter, travels through an aerated fluid in a container, and is received by at least one acoustic receiver has been disclosed. A signal processor may be configured to receive this signal containing information about an acoustic signal, and then determine the gas volume fraction of the aerated fluid based at least partly on the speed of sound measurement of the acoustic signal that travels through the aerated fluid in the container.

Additionally, an apparatus has been disclosed having an acoustic-based air probe with an acoustic source configured to provide an acoustic signal into a mixture of concrete, an acoustic receiver configured to be substantially co-planar with the acoustic source, to respond to the acoustic signal, and to provide signaling containing information about the acoustic signal injected into the mixture of concrete. This device reportedly allowed for real-time air measurement in wet concrete in order to control the amount of air in a mixture of concrete. By using relatively low frequencies, these acoustic transducer/receiver systems can employ dual-frequency methods to minimize background noise. This was reported to be advantageous for concrete mixing, as aggregates are in constant motion, creating collisions against the mixer drum, and hence potentially confusing acoustic wave sources.

Concrete mixes are complex fluid suspensions. Concrete is variably heterogeneous because different manufacturers can employ different mix designs, cements, aggregate particle sizes and shapes, and water/cement ratios, as well as different types and amounts of chemical admixtures. A change in one component will likely have a significant effect on other components.

Moreover, the mixing of concrete can exert a harsh effect on the components. During rotation in a mixer drum, small aggregates such as sand particles can function as abrasives; while coarse aggregates, such as small stones or crushed gravel, can exert multiple impacts as they are continuously move through the mixed fluid.

Consequently, using traditional electro-acoustic devices, particularly ones with mechanical pistons, can give rise to potential risks. The migration of cement paste or fine sand particles into moving parts can jeopardize the acoustic transmitter/receiver components; while repeated impacts of stones and gravel, borne by the rotated weight of hundreds of pounds of concrete, undoubtedly also threatens their accuracy and longevity.

SUMMARY OF THE INVENTION

The present invention overcomes the drawbacks of the prior art systems for determining physical properties of a material, such as a liquid. The physical property may be its percentage of air. The present invention does not require the need to make an accurate measurement of the speed of sound in the material, which is often difficult to obtain, nor does it require the measurement or estimation of other properties of the material, such as density or bulk modulus. The present invention also does not require the use of these physical properties, which are often inaccurately measured or estimated, in complex mathematical equations in order to attempt to compute the percentage of air in the material.

The present system is based on the recognition that the values of the physical properties of a liquid, such as the percentage of air, have a direct correlation to the values of the radiation load caused by the fluid acting on the radiating surface of an electroacoustic transducer that is in contact with the fluid, and that the value of this radiation load will be a function of frequency. The present system further recognizes that the variations in the radiation load on a specific transducer caused by the variations of a specific physical parameter of a specific type of liquid will cause a distinct and repeatable variation in the electrical characteristics of the transducer, such as its impedance or admittance. It is further recognized that this electrical variation of the transducer will typically be more pronounced and easier to measure more accurately over a frequency range that contains one of its resonance frequencies.

The inventive system then utilizes predetermined knowledge of how the variation of a specific physical property, such as the percentage of air content, of a specific liquid, such as concrete, correlates with the electrical characteristics of a specific electroacoustic transducer, wherein the electroacoustic transducer has its radiating surface in contact with the liquid at a specific frequency or frequencies, or over a specific frequency band. In some embodiments, this frequency band includes a resonant frequency of the transducer. By measuring the electrical characteristics of the transducer, the present system is able to determine in real-time the value of the specific physical property as it changes.

Such real-time measurements are important in maintaining the mechanical integrity of structures fabricated with fluids such as hydratable cementitious suspensions having air bubbles. The application of this novel principle as described in this invention allows air content measurements to be made in real-time utilizing a single rugged electroacoustic transducer operating in its resonant region.

BRIEF DESCRIPTION OF THE DRAWINGS

An appreciation of the benefits and features of the invention may be more readily comprehended when the following written description of preferred embodiments is considered in conjunction with the drawings, wherein.

DETAILED DESCRIPTION

Figure 1:
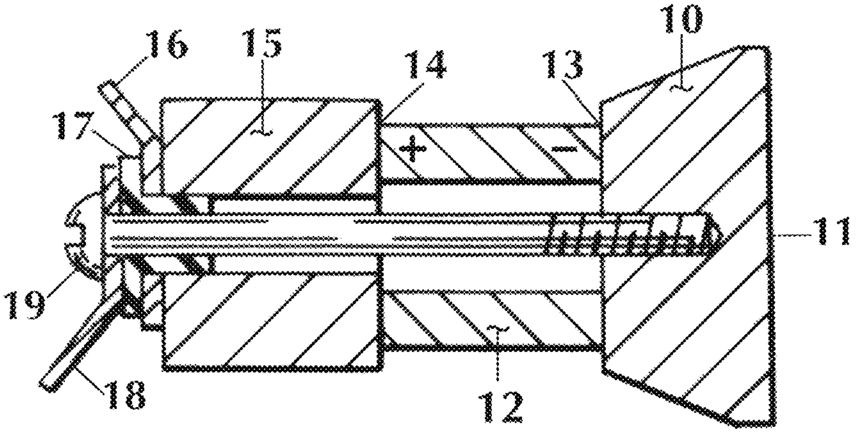
FIG. 1 is a schematic cross-sectional representation of a mass loaded vibratile Tonpilz transducer, which is one type of electroacoustic transducer that could be used in an embodiment of this invention.

The invention is intended to measure physical properties in materials, such as liquids. The physical property may be the content of air or another gas. The liquid may include suspensions and slurries in which solid particles are carried within the fluid. As used herein, the term "suspension" or "slurry" means and refers to a dispersion of solid particles in a liquid, which may include cementitious and non-cementitious fluid suspensions. Examples include paper pulp, muds (e.g., drilling muds), cement paste, concrete, mortar, shotcrete, fermented and carbonated liquids and slurries, food slurries and pastes, cosmetics, and hydraulic oils. Slurries are types of suspensions wherein viscosity is low enough to enable pumping, e.g., to facilitate transportation of the suspended solid phase such as pumping plastic (wet) concrete mixes through hoses. Among key characteristics of fluid suspensions are the volume fraction of solids and viscosity. The concept of viscosity can sometimes be correlated to the solid's volume fraction within the liquid carrier.

Definitions

The term "air content" as used herein refers to both "entrapped" and "entrained" air as a percentage of total suspension volume. These air concepts are helpful distinctions and are often used when discussing cement pastes, concrete, shotcrete, mortar, and other hydratable cementitious mixtures. Entrapped air is a result of folding or mixing in air and trapping it physically within the liquid suspension. On the other hand, entrained air is formed through use of (chemical) air entraining admixtures, which are surfactants that encourage the stability of bubbles formed during the mixing process. Typically, entrained air bubbles are much smaller and more spherical than entrapped air bubbles, and are thus easier to distribute more uniformly within the body of the cementitious mixture. Construction materials, such as concrete, rely on the size and distribution of entrained air bubbles to improve durability against freeze-thaw damage.

The term "concrete" as used herein will be understood to refer to materials including a cement binder (e.g., Portland cement optionally with supplemental cementitious materials such as fly ash, granulated blast furnace slag, limestone, or other pozzolanic materials), water, and aggregates (e.g., sand, crushed gravel or stones, or mixtures thereof), which form a hardened building or civil engineering structure when cured. The concrete may optionally contain one or more chemical admixtures, which can include water-reducing agents (so called because they permit a cut in the water required while maintaining plasticity), mid-range water reducing agents, high range water-reducing agents (often called "superplasticizers"), viscosity modifying and other rheology modifying agents, corrosion-inhibitors, shrinkage reducing admixtures, set accelerators, set retarders, air entrainers, air detrainers, strength enhancers, pigments, colorants, shrinkage reducing agents, fibers for plastic shrinkage control or structural reinforcement, and the like. The term "concrete" will be used for illustrative purposes, although it will be understood that other hydratable cementitious fluid compositions, such as cement paste, mortar, shotcrete, gypsum cementitious compositions, well-bore cements, as well as other cementitious compositions used in construction, are also applicable.

The phrase "real-time" or "near real-time" as used herein refers to the time delay introduced by automated data processing or network transmission between the occurrence of an event and the use of the processed data.

Automated concrete slump management (monitoring) systems for managing slump or other rheological properties (e.g. slump flow, yield stress, viscosity) are commercially available. Commercial monitoring systems, which employ hydraulic pressure sensors and rotational sensors, are commercially available from Verifi LLC, a wholly owned subsidiary of GCP Applied Technologies Inc, under the VERIFI® trade name. The patent literature contains various automated concrete monitoring systems, which may be programmed to perform the methods disclosed in the present invention.

Alternatively, the air sensing systems and devices of the present invention may be implemented using a slump or rheology monitoring system based on use of a force sensor which is mounted within the drum.

Automated concrete monitoring systems are used customarily for monitoring "slump," which is a measure of the workability of a concrete mixture, and may be measured using a "slump" cone in accordance with standards such as ASTM C143/C143M, C1611/C1611M. However, it will be understood that the present invention is applicable during the monitoring of other concrete rheology behaviors, including slump as well as slump flow, yield stress, viscosity, and other rheological parameters. The present invention may be used in connection with monitoring of these various concrete mix rheology behaviors, in other words, although the term "slump" is used herein for simplicity of illustration.

Electroacoustic Transducer

This invention utilizes an electroacoustic transducer that has its radiating surface in contact with the liquid being measured. The electroacoustic transducer can be one of many different types known in the art. For example, it could use many different types of transduction, such as electromagnetic, electrostrictive, or piezoelectric. One embodiment of the invention may use a resonant transducer. It may be designed using a wide variety of different resonant structures, such as a resonate cylinder, a resonate disc, or a half-wavelength resonator. FIG. 1 shows a cross-sectional view of one possible embodiment of a transducer that could be used in the inventive system. It is a mass loaded vibratile piston type, also known as a Tonpilz transducer. FIG. 1 only shows the vibrating portion of the assembly. The protective housing around the resonating structure is not shown.

The vibrating piston 10 may be made of any suitable electrically conductive material, such as aluminum, for example. A cylindrical transduction element 12 may be made of any well known piezoelectric ceramic material, such as lead zirconate titanate or barium titinate. Electrodes 13 and 14, which are made of a conductive material, such as fired silver, are formed on each end of the cylindrical transduction element 12. An electrically conductive cylindrical inertial mass element 15 may be made of steel, for example. Typically, the inertial mass element 15 is designed to be several times the mass of the vibrating piston 10.

The electrode 13 on one end of the hollow, polarized, piezoelectric cylindrical transduction element 12 is bonded to one side of the vibrating piston 10. The inertial mass element 15 is bonded to the electrode 14 on the opposite end of the cylindrical transduction element 12. On each end, the bonding is accomplished by means of a conducting adhesive, such as an epoxy mixed with a silver dust.

The inertial mass element 15 has a clearance hole passing through its axis for receiving an electrically conducting stress bolt 19. As a result, an assembly may be completed by inserting an insulating collar 17 through the stress bolt 19 between terminal lugs 16 and 18. The stress bolt 19 is tightened into a tapped hole machined into the vibrating piston 10 to finish the assembly. Any suitable spring means, such as a Belleville spring washer (not shown) may be placed under the head of the screw 19 to control the compression stress applied to the cylindrical transduction element 12.

When the assembly of FIG. 1 is completed, a negative electrical potential appears on electrode 13 and at the terminal lug 18, the circuit being completed via the stress bolt 19. An electrical connection is also completed from the positive electrode 14 to the terminal lug 16, which is in contact with the inertial mass element 15.

Thus, the assembly of FIG. 1 provides means for conveniently making electrical connections to the ceramic cylindrical transduction element 12 without requiring any direct connections of wires or foil to the electrodes. All electrical potentials appear at the terminal lugs 16 and 18 on the rear of the transducer assembly. In operation, the radiating surface 11 of the transducer will be in intimate contact with the liquid being monitored.

Figure 2:
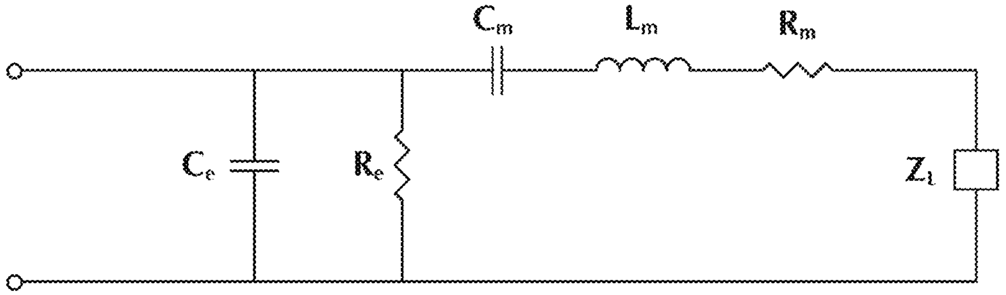
FIG. 2 is a simplified equivalent circuit of an electroacoustic transducer, such as the one shown in FIG. 1.
Figure 3:
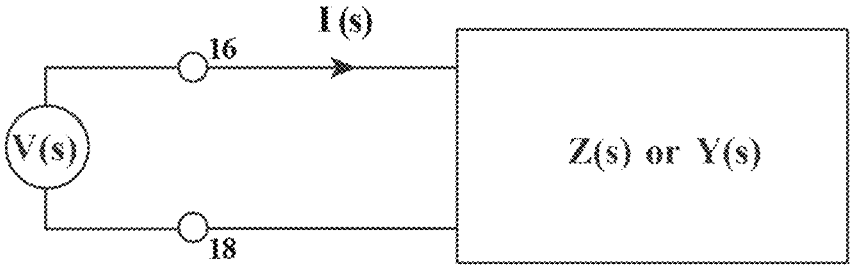
FIG. 3 is a frequency domain representation of the circuit shown in FIG. 2 illustrating the transfer functions for the driving point impedance and admittance.

FIG. 2 shows a simplified equivalent circuit of an electroacoustic transducer utilizing piezoelectric material for transduction, such as is depicted in FIG. 1. The transducer contains electrical components with subscripts "e", mechanical components with subscripts "m". and a load impedance with a subscript "L". The mechanical and load components of the transducer have been reflected to the electrical side of the electric/mechanical transformer. The components in the transducer's equivalent circuit are:

$C_e$ is the electrical capacitance;

$R_e$ is the electrical loss;

$C_m$ is the capacitance of the mechanical system, and it represents the equivalent compliance of the vibrating structure;

$L_m$ is the inductance of the mechanical system, and it represents the equivalent mass of the vibrating structure;

$R_m$ is the losses in the mechanical system, and represents the mechanical losses of the vibrating structures; and $Z_L$ is the complex impedance of the radiation load caused by the fluid acting on the radiating surface of the vibrating structure The circuit of FIG. 2 can be represented in the frequency domain by the transfer function shown in FIG. 3. In this representation, there is a voltage V(s) applied across terminal lugs 16 and 18 of the transducer, and a current I(s) is passing through the transducer. These are the Laplace transformations of the time domain input voltage v(t) and input current i(t), where $s=\delta+j\omega$, where s is a complex frequency having $\delta$ as the real component and $\omega$ as the imaginary component. The transfer function would therefore be either the driving point impedance of the transducer, Z(s), or its driving point admittance, Y(s). They are defined as:

$$Z(s) = \frac{V(s)}{I(s)} \quad (1)$$

$$Y(s) = \frac{I(s)}{V(s)} \quad (2)$$

$$Z(s) = \frac{1}{Y(s)} \quad (3)$$

The impedance and admittance transfer function of the transducer will change as a function of frequency as the radiation load changes over the same frequency range due to changes in a physical parameter, such as air content, of the liquid. The changes in the impedance or admittance of a specific transducer design will correlate with the changes in the physical parameter of the liquid. These variations in impedance or admittance can be measured by one knowledgeable in the electronic art of circuit design. The measurements can be done over a wide range of frequencies, but a preferred frequency band is one that includes a mechanical resonance of the transducer and more particularly at the fundamental resonance, since at the resonant frequencies, large variations occur in the impedance or admittance of the transducer, and the values of these large variations change as a function of changes in the physical property of the liquid. Therefore, for ease of understanding, the following description of a preferred embodiment of the inventive system contains a transducer operating in the frequency band of its fundamental resonant frequency, and the specific aspects of the transfer function that will be monitored are the magnitude of the transducer's impedance as a function of frequency. In addition, the liquid contains cement, and the physical property is air content. This does not exclude the invention from other system designs that will be obvious to one skilled in the art, such as operating at other frequencies or other resonances that use other aspects of impedance or admittance, such as phase, or that monitor other physical properties or other liquids.

Transducers typically have a fundamental resonance and various additional resonances at higher frequencies. The fundamental resonance can be determined by computing the impulse response of the transfer function of FIG. 3, since the Laplace transform of an impulse has a constant value of magnitude for all frequencies. The fundamental resonant and antiresonant frequencies can be calculated from the circuit components shown in the equivalent circuit of FIG. 2. The fundamental resonant frequency, $f_r$, and antiresonant frequency, $f_a$, of the transducer of FIG. 2 are $$f_r = \frac{1}{2\pi}\sqrt{\frac{1}{L_m C_m}} \quad (4)$$

$$f_a = \frac{1}{2\pi}\sqrt{\frac{C_e + C_m}{L_m C_e C_m}} \quad (5)$$

The value of the electrical, mechanical, and loss components of the equivalent circuit of FIG. 2 will be a function of the particular design of the transducer, but for any specific transducer design, they will always be nominally the same. If the radiating surface of the transducer is not in intimate contact with the liquid, as occurs when radiating into air, the impedance of the radiation load, $Z_L$, will be very low. If the radiating surface of the transducer is in intimate contact with the fluid, the radiation load, $Z_L$, will be a much larger value based on the specific design of the transducer, the area of its radiating surface 11 in FIG. 1, and the physical characteristics of the fluid. For a specific transducer and a specific liquid, the major variations in $Z_L$ will be a function of the changes in the air content of the fluid. The higher the air content, the lower the value of $Z_L$.

Figure 4:
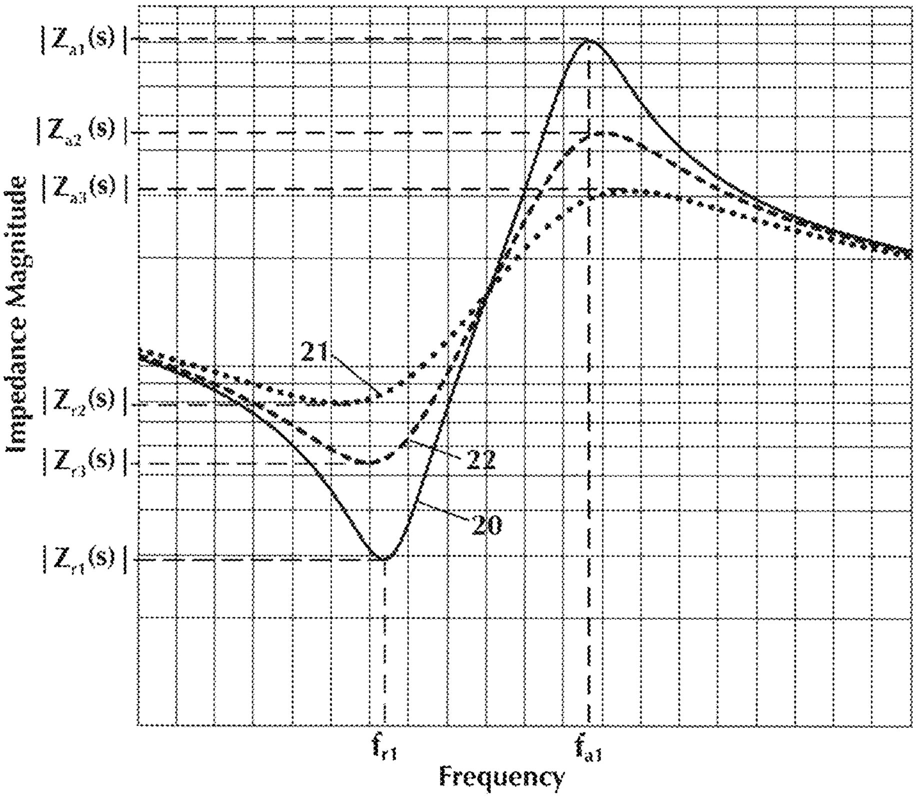
FIG. 4 contains illustrative graphs showing how the magnitude of the impedance over the frequency range encompassing resonance and antiresonance of a transducer, such as the one shown in FIG. 1, will change when its radiating surface is in contact with air, in a liquid containing 0% entrapped air, and in a liquid containing a percentage of entrapped air.

To better explain this concept, FIG. 4 shows several possible curves of the magnitudes of the impedance as a function of frequency in the vicinity of resonance for a specific transducer operating with its radiating surface in air, and also with it in contact with a specific liquid while the air content of the fluid was changed. Each curve is for a specific condition of radiating load on the transducer. Curve 20 of FIG. 4 shows the magnitude of the impedance of the transducer with the radiation load, $Z_L$, very low because the transducer is radiating into air, which is referred to as fluid condition 1. The impedance magnitude curve drops to a minimum value of $|Z_{r1}(s)|$ at the resonant frequency $f_{r1}$. As the frequency is increased, the impedance magnitude also increases until it reaches a maximum value of $|Z_{a1}(s)|$ at the antiresonant frequency of $f_{a1}$. The activity of the transducer, expressed in dB, for fluid condition 1, radiating into air, is $A_1$, in which $$A_1 = 20\log\frac{|Z_{a1}(s)|}{|Z_{r1}(s)|}\ \text{dB} \quad (6a)$$

When the radiating surface of the transducer is immersed into the liquid which contains no air bubbles, referred to as fluid condition 2, the impedance magnitude is depicted by curve 21 of FIG. 4. As can be seen, the impedance magnitude curve drops to a minimum value of $|Z_{r2}(s)|$ at the resonant frequency $f_{r2}$. Since the shift is frequency is very small, the different resonant and antiresonant frequencies are not shown. As the frequency increases, the impedance magnitude increases to a maximum value of $|Z_{a2}(s)|$ at the antiresonant frequency of $f_{a2}$. The activity for fluid condition 2, no air in the liquid, will be $$A_2 = 20\log\frac{|Z_{a2}(s)|}{|Z_{r2}(s)|}\ \text{dB} \quad (6b)$$

Fluid condition 3 is defined as a liquid having the air content in some specific value between 0% and 100%. The minimum and maximum values of the impedance magnitude for this fluid condition 3 would fall in between the minimum and maximum values for 0% and 100% air, as shown in curve 22 of FIG. 4. The activity for this fluid condition 3 will be $$A_3 = 20\log\frac{|Z_{a3}(s)|}{|Z_{r3}(s)|}\text{ dB} \quad (6c)$$

It has been found that for the combination of a specific transducer and a specific fluid, the percentage of air in the fluid is a function of the activity of the impedance magnitude of the transducer. As an example of this, two different transducers were designed and fabricated. Transducer A is a small Tonpilz transducer with a resonant frequency equal to approximately 37.5 kHz when radiating into air. Its rectangular resonating surface was 0.60 $in^2$. Transducer B consists of a 2×2 array of four identical Tonpilz transducers electrically wired in parallel that resonate at approximately 56 kHz when radiating into air. Each element had a resonating surface that was 0.63 $in^2$, resulting in a total radiating surface of 2.52 $in^2$.

Several concrete mixes were tested using a typical high-range water-reducer (HRWR) mix containing 371 $kg/m^3$ of cement, 860 $kg/m^3$ of sand, 1009 $kg/m^3$ of stone, 184 $kg/m^3$ of water, and a commercially available HRWR from GCP Applied Technologies under the ADVACAST® 575 trademark. In addition, variable amounts of air entraining admixtures and air defoamers were incorporated into the mix to vary the amount of air content within the concrete.

The concrete components were mixed in a lab-scaled pan mixer with 0.0396 $m^3$ of concrete and the following protocol: First, stone, sand, air entraining admixture and water were mixed for 1 minute at a high speed; then cement was added and mixed for 1 minute at high speed; and, following this, the HRWR and the air defoamer were added and mixed for 2 minutes at high speed. Immediately following, the mixing speed was reduced while the mixing continued for an additional 2 minutes. After mixing, the radiating surface of both Transducer A and Transducer B were immersed into the cement mixture and the magnitude of the impedance versus frequency was measured on each of them in the vicinity of resonance. The minimum and maximum values of the impedance magnitude were recorded, and the activity of each transducer was calculated using Equation (3). Simultaneously, both the air content and slump were measured following ASTM C231-14 (Type B meter) and ASTM 143-15a respectively.

Figure 5:
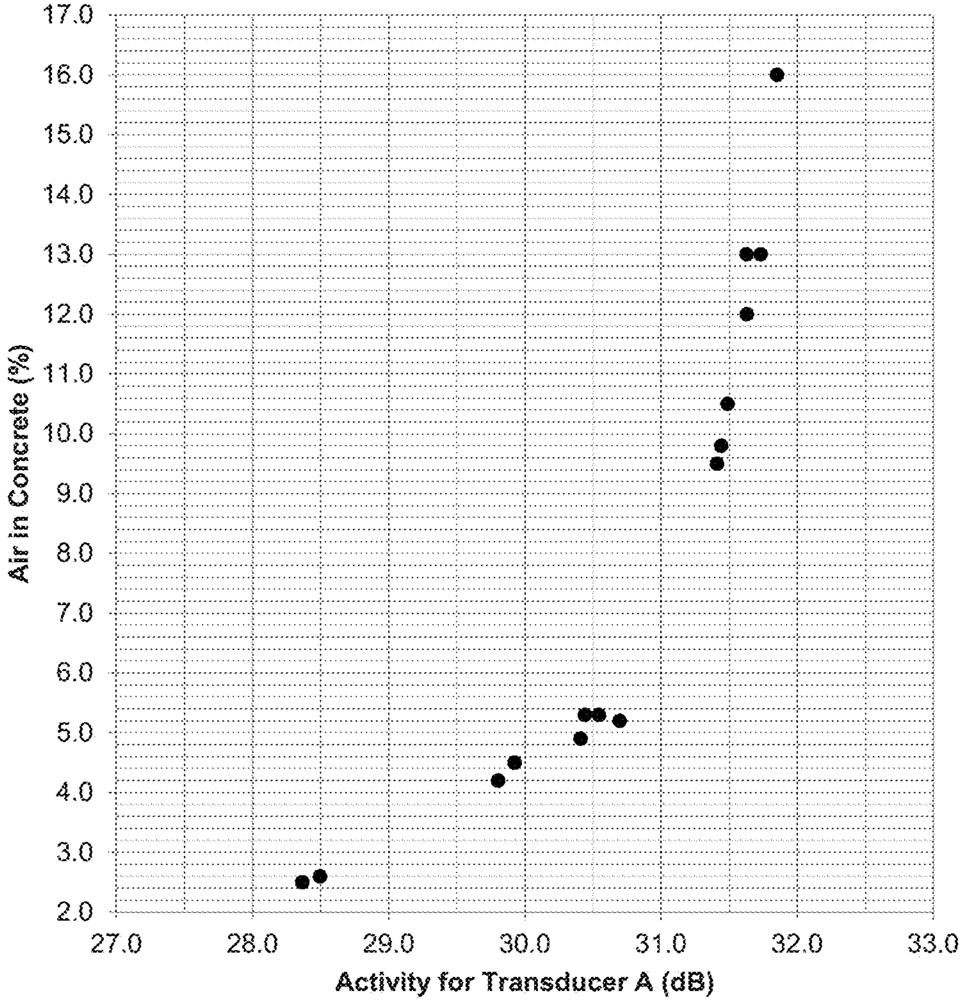
FIG. 5 is a scatter plot of experimental data obtained using Transducer A, which is a specific design of a transducer of the type shown in FIG. 1. The activity of the impedance of Transducer A between the resonant frequency and the antiresonant frequency was measured as the transducer's radiating surface was immersed in concrete containing different percentages of air. The data shows that there is a distinct mathematical relationship between the activity of this specific transducer and the percent of air in the concrete.
Figure 6:
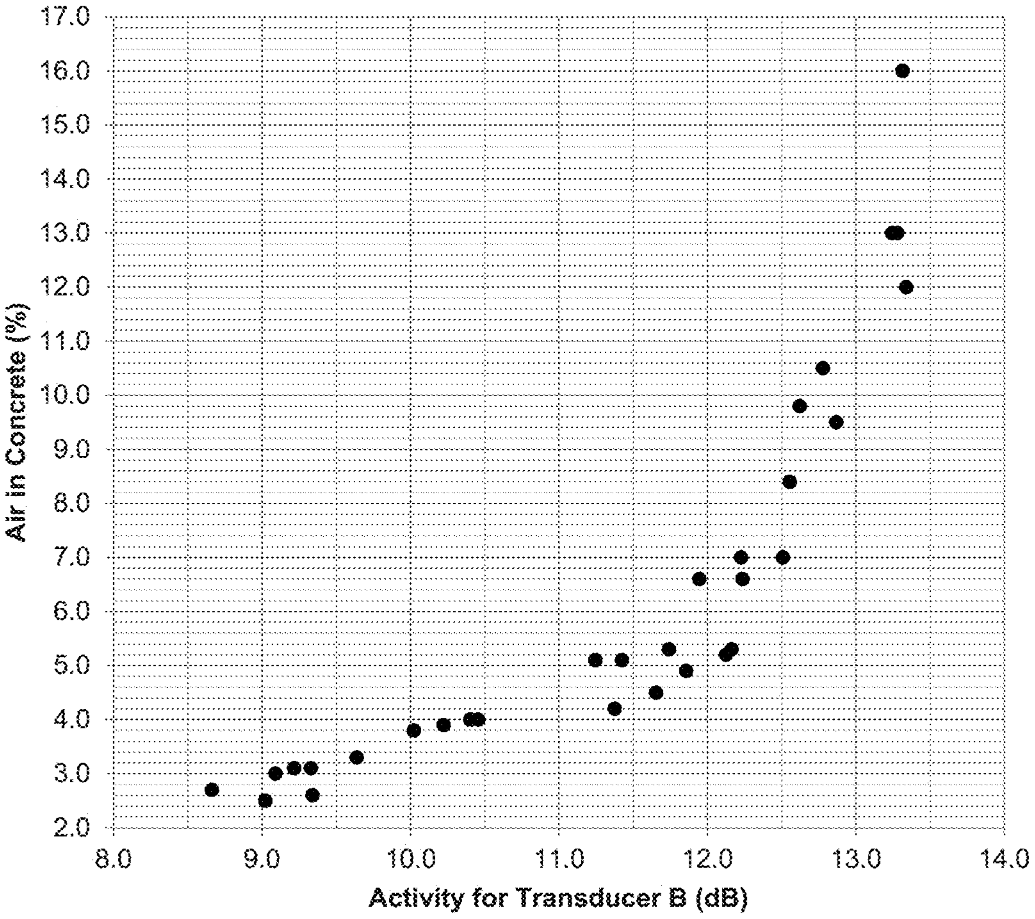
FIG. 6 is a scatter plot of experimental data that was obtained in a similar manner as the data in FIG. 5, except a transducer with a different specific design, Transducer B, was used. The data shows that there is a different mathematical relationship between the activity of Transducer B and the percent of air in the concrete than occurred with Transducer A, but the relationship of percentage of air as a function of activity is still distinct.

FIG. 5 contains a scatter plot of the activity of Transducer A that was measured while the transducer's radiating surface was immersed in each mixture of concrete as a function of the percentage of air that was measured for each concrete mixture. FIG. 6 shows a similar scatter plot containing the activity of Transducer B as a function of the percentage of air in each concrete mixture.

As can be seen from a comparison of FIGS. 5 and 6, for each transducer, there is a very strong correlation between the activity of the impedance magnitude and the air content of the concrete. However, the plots are different from each other because of the differences in the designs of Transducer A and Transducer B. For a given transducer design, however, it is possible to first measure the distinct variation of the activity as a function of the air content of the concrete. An instrument can then be designed by one skilled in the art that will be able to continually measure and compare the activity of the given transducer immersed in an unknown concrete mixture to the previously measured curve of the activity as a function of air content for that transducer, and thus determine in real-time the air content of the concrete mixture.

Further, mathematical methods may be used to identify the important characteristics that are used to measure air content and other parameters. For example, PLS (partial least square), PCA (principle component analysis) and other techniques are typically used to correlate spectra to outputs without having to specifically identify features within the spectra. Machine learning techniques can also be implemented to analyze the frequency sweep information to identify features that can be correlated with air content or other parameters. Advanced mathematical techniques may be especially suited when trying to determine mathematical relationships across different concrete mixture proportions. Thus, these methods may also be used to analyze the measurements made by the transducer.

Figure 6A:
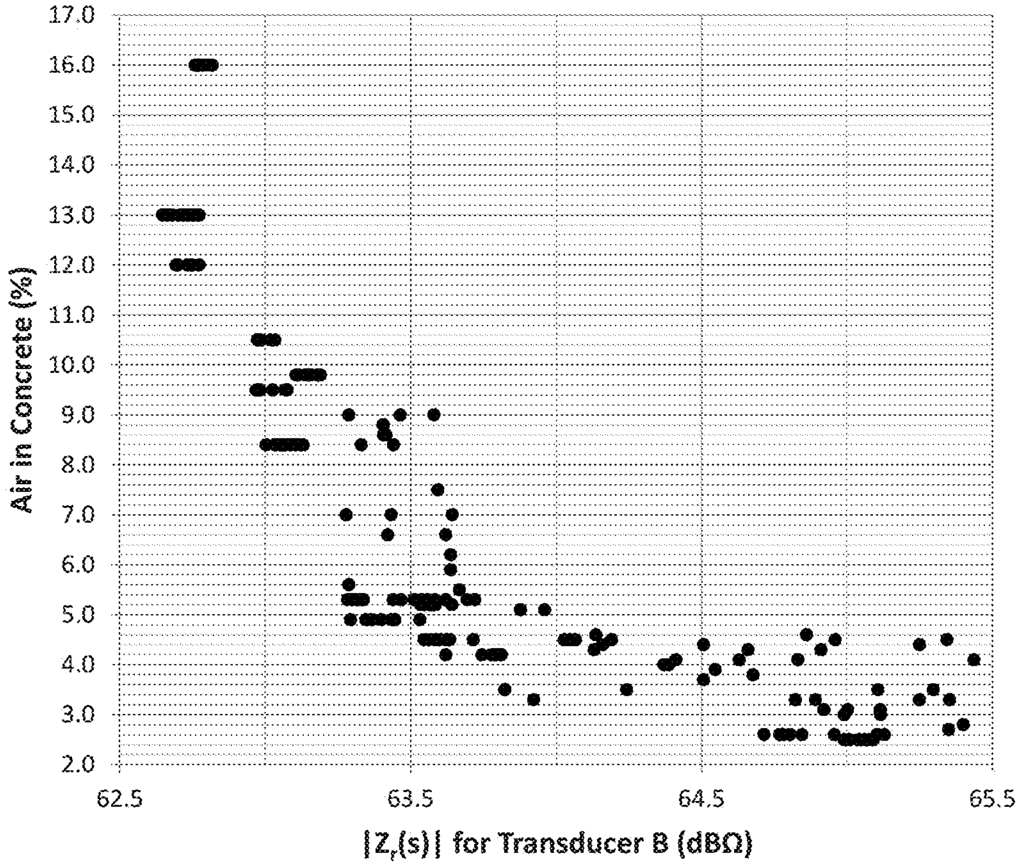
FIG. 6A is a scatter plot of experimental data using a specific design of a transducer of the type shown in FIG. 1. A scatter plot shows the magnitude of the impedance at the resonant frequency in dBΩ for Transducer B that was measured while the transducer's radiating surface was immersed in each mixture of concrete as a function of percentage of air that was measured for each concrete mixture.
Figure 6B:
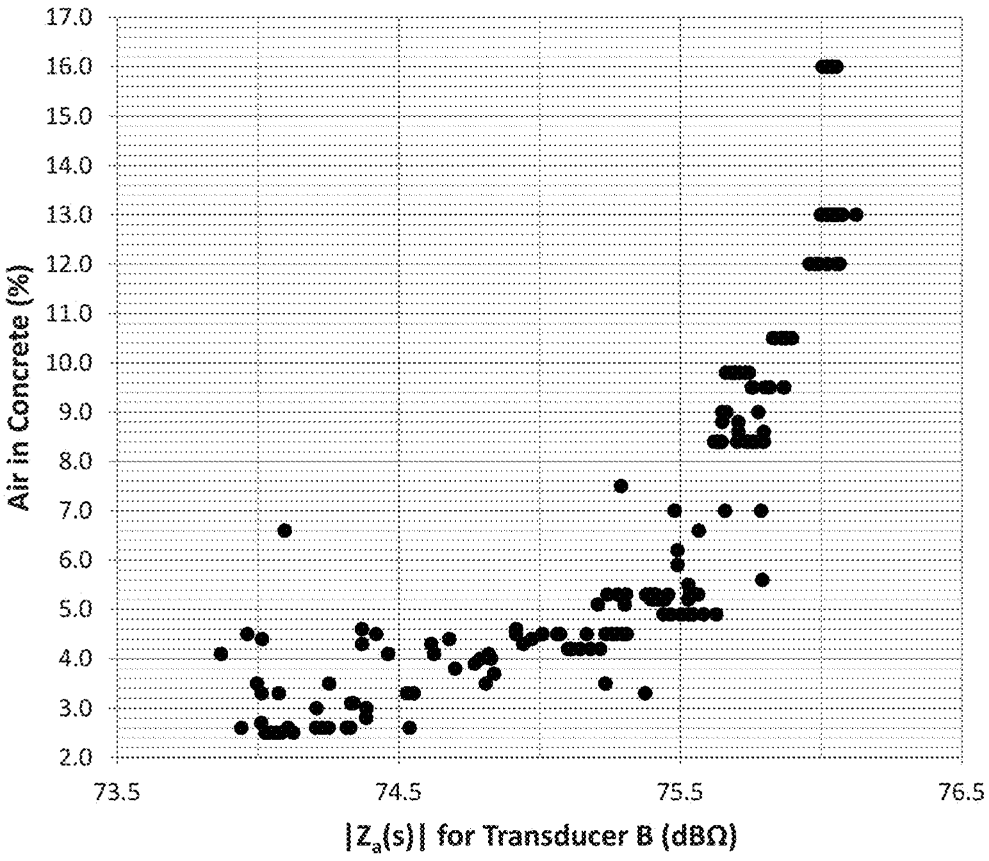
FIG. 6B is a scatter plot similar to FIG. 6A, which shows the magnitude of the impedance at the antiresonant frequency in dBΩ for Transducer B that was measured while the transducer's radiating surface was immersed in each mixture of concrete as a function of percentage of air that was measured for each concrete mixture.

FIGS. 5 and 6 show that the activity of the impedance of a transducer can be used to determine the value of a physical property, such as air content, in a liquid, such as concrete. However, activity of the impedance is not the only electrical characteristic of the transducer that can be used to determine the value of a physical property. For example, the magnitude of the impedance at resonance, $|Z_r(s)|$, or the magnitude of the impedance at antiresonance, $|Z_a(s)|$, could also be used. FIG. 6A contains a scatter plot of the $|Z_r(s)|$ in dBΩ for Transducer B that was measured while the transducer's radiating surface was immersed in each mixture of concrete as a function of percentage of air that was measured for each concrete mixture. FIG. 6B shows a similar scatter plot containing the $|Z_a(s)|$ in dBΩ for Transducer B as a function of the percentage of air in the concrete. These two plots also show that a correlation exists between these impedance magnitude measurements and the air content of the concrete. Similar correlations could be found using other electrical characteristics, such as the difference between $|Z_r(s)|$ and $|Z_a(s)|$, or the change in phase of the impedance in the vicinity of resonance and antiresonance, or the values of $f_r$ and $f_a$, which shift slightly as the air content changes. These and other electrical characteristics of the transducer that can be used to determine the value of a physical property of a liquid will readily occur to those skilled in the art. Therefore, even though the characteristics of activity of the impedance of the transducer is primarily used in the examples in this application, other electrical characteristics of the transducer that correlate with the physical property of the liquid can also be monitored (e.g., an inflection point that resides between the minimum and maximum values).

Figure 10:
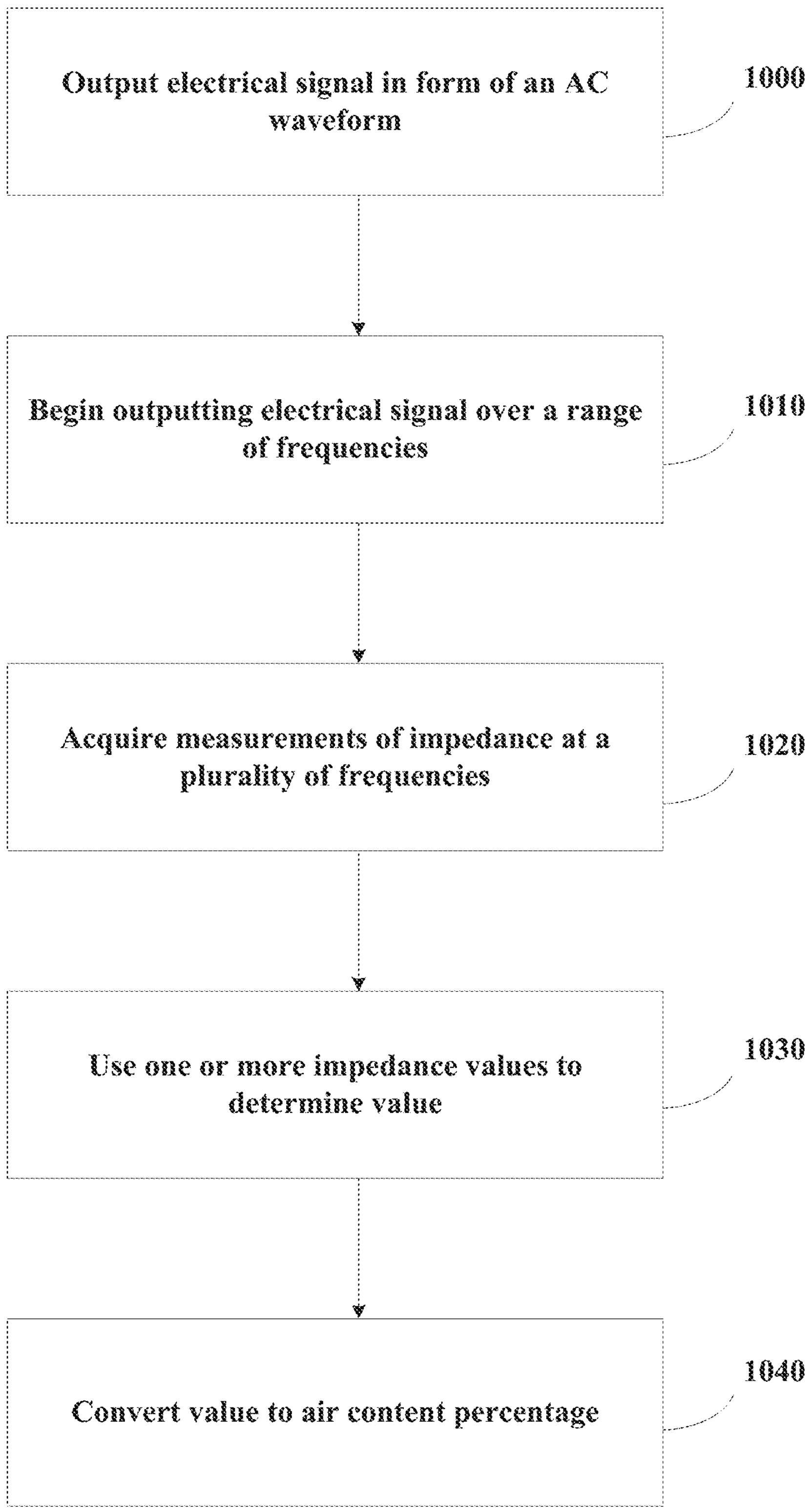
FIG. 10 shows an exemplary sequence for determining the air content in a liquid.

Thus, in one embodiment, a method of determining the air content of a liquid is disclosed. As shown in FIG. 10, the determination of air content involves a plurality of processes. First, as shown in Process 1000, an electrical signal, in the form of an AC waveform, is output to an electroacoustic transducer. This electrical signal is varying such that it is output at a plurality of frequencies. Thus, in Process 1010, the electrical signal is output over a frequency range, where this frequency range may include both the resonant frequency and anti-resonant frequency of the transducer. In this disclosure, the term "frequency range" denotes a change in frequencies spanning at least two distinct frequencies. A measurement of the impedance of the transducer is acquired at a plurality of frequencies in this frequency range, as shown in Process 1020. The impedance value at the resonant frequency, the impedance value at the antiresonant frequency, or both are then used to determine a value that is indicative of the air content, as shown in Process 1030. For example, an activity, as shown in FIGS. 5 and 6, may be determined. Alternatively, the impedance at the resonant or anti-resonant frequency, as shown in FIGS. 6A-6B, may be used. This value is then converted to an air content percentage, as shown in Process 1040. This conversion may be performed by comparing the value to a table that is stored in a computer accessible memory or database. For example, a table may have two columns; the first is the measured value and the second is the air content corresponding to that measured value. Alternatively, this conversion may be performed by inserting the value into an equation or algorithm that generates the air content percentage. In this manner, the air content may be determined.

In another embodiment, the electrical signal does not need to be swept across a range of frequencies. For example, the electrical signal may be output at one or more discrete frequencies, such as the resonant frequency and the anti-resonant frequency.

Uses of Electroacoustic Transducer

Figure 7:
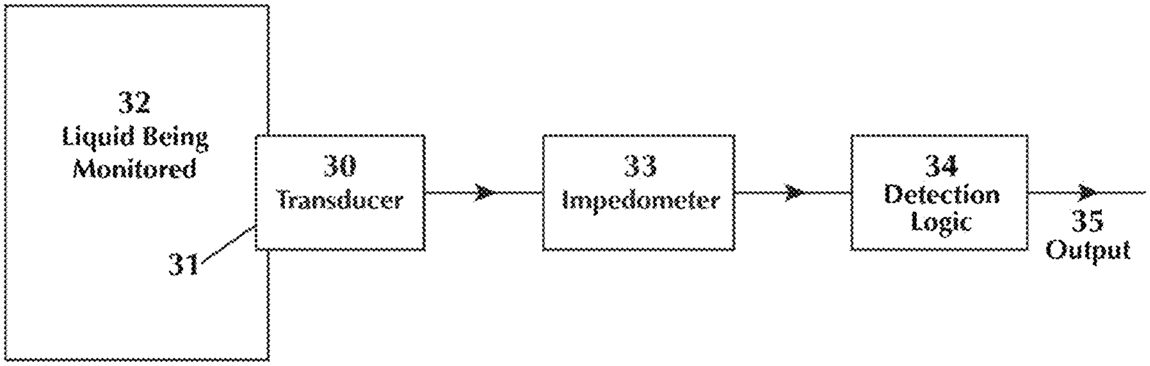
FIG. 7 is a schematic block diagram illustrating an exemplary system of this invention.

FIG. 7 is a schematic block diagram illustrating a system which utilizes the electroacoustic transducer. A transducer 30 is mounted so that its radiating surface 31 is in contact with the liquid 32 being monitored, which could be a material such as plastic concrete. Liquid 32 could be in an open container, or it could be in a closed container. If the liquid is concrete, this container may be a rotating mixer drum, such as a concrete mixer drum. Alternatively, the container may be a stationary mixer, such as a pan mix, twin shaft mixer, planetary mixer or others used in the precast concrete industry. In some embodiments, the container may be the formwork, which is the mold into which the concrete is poured. In yet other embodiments, the container may be an airpot, where the output may be compared to the results of an ASTM C231 test. In yet other embodiments, the container may be a concrete mixer tuck, as described in more detail below. Transducer 30 could be permanently mounted onto the container holding liquid 32, or it could be mounted into a hand-held fixture and immersed into the liquid. It is only required that the radiating surface 31 of the transducer is in contact with the liquid being monitored 32.

The transducer 30 may also be disposed in a pipe or tube through which concrete is pumped that is either placed by a pump boom, 3D printed nozzle, or a shotcrete nozzle. Additionally, the transducer 30 can be implemented at the concrete truck and a pump boom, 3D printing nozzle or a shotcrete nozzle. By knowing the air before and after pumping, the typical air loss can be measured and recorded. This information can be recorded along with the mix design, batch weights and other properties, such as slump, temperature, and age. Regression models, such as multiple linear regression, machine learning techniques, and others, can be used to predict the air loss. This information can then be used to adjust air before passing through the pumping process so that the air after pumping will be within target. A similar method can be used by measuring air before and after the pump boom, such as at the pump boom and in the formwork, to adjust for the air loss as the concrete drops into the formwork. Alternatively, the air in the truck and formwork could be measured and the air change can be predicted based on length of piping, pumping process and other parameters.

Transducer 30 could be of a wide variety of different designs that would readily occur to one skilled in the art. The only requirement is that it be designed to resonate during operation. The frequency of resonance of transducer 30 may be in any range, but may advantageously reside in the ultrasonic range. That is because the size of the resonating structure of a transducer usually becomes larger as the resonant frequency is lowered. A transducer that resonates in the audible range is therefore usually very large and heavy, which would make it difficult to use in most applications. In addition, the cost of the audible transducer would be much higher than that of an ultrasonic unit.

Transducer 30 is connected to a Measurement/Detection Circuit, which is designed to first detect the electrical characteristics of the transducer that are varying as a function of the change of the physical property of the liquid that is being monitored, and then to determine the value of said physical property of the liquid. For illustrative purposes, in this example, the electrical characteristic of the transducer that is being measured is the impedance, but the Measurement/Detection Circuit could be designed to measure any electrical characteristic that correlates with the physical property of the liquid that is being monitored. Therefore, in this embodiment, the Measurement/Detection Circuit is comprised of an Impedometer 33, which in this specific embodiment will only need to measure the impedance magnitude of the transducer. This could be one of many circuits that can be purchased or be easily designed by one skilled in the art. For instance, it could be a circuit that supplies an AC constant current signal to the transducer. The frequency of the signal then sweeps over a range that includes both the resonant frequency $f_r$ and the antiresonant frequency $f_a$ of the transducer 30. The magnitude of the voltage that appears across the transducer 30 would then be directly proportional to the magnitude of the impedance.

The detection logic 34 could be constructed as a number of different circuit concepts known by one skilled in the art. For example, it could be designed using a microprocessor based system that would monitor the output of impedometer 33 as the frequency of the excitation signal applied to transducer 30 sweeps over the range that includes both the resonant frequency, $f_r$, and the anti-resonant frequency, $f_a$. It will determine the minimum value of the impedance magnitude, $|Z_r(s)|$, and the maximum value, $|Z_a(s)|$, and then compute the Activity, A, using equation (6). The value of A will then be compared to the premeasured curve of the activity as a function of air content for the specific design of transducer 30 operating with its radiating surface 31 in contact with the specific liquid 32 being monitored. Of course, as described above, other parameters besides activity may be used as the basis for comparison. From this comparison, the detection logic 34 will determine the percentage of air in the liquid, which will be contained in output 35. This output could be one of many possible outputs that could be desired. For example, it could be a display on a screen or dial showing the percentage of air in the liquid, or it could be an electronic signal containing the air content information sent by wired or wireless transmission to other electronic systems.

Figure 8:
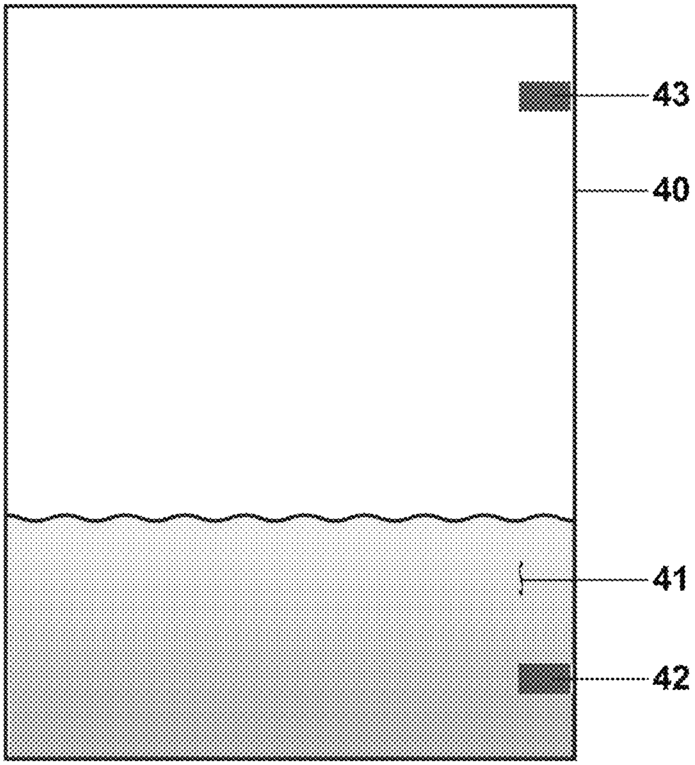
FIG. 8 is a schematic illustration showing another possible embodiment of the invention that shows a tank containing a liquid and two immersion detection systems that determine if the radiating surface of the transducer is radiating into air or the liquid. One system is positioned near the top of the tank and the other is positioned near the bottom. The two systems can then detect when the tank is almost full, and when it is almost empty.

Another possible embodiment of this invention would be a simpler system that only detects when the transducer is immersed in a liquid and when it is not. Such a system could be used in a number of different applications. For instance, it could be used in liquid level detection systems, as shown in FIG. 8. As can be seen in the figure, a tank 40 contains a liquid 41. The level of the liquid 41 will rise as fluid is put into the tank, and it will drop as fluid is removed. In the case of FIG. 8, the tank contains two immersion detection systems. Immersion detection system 42 is placed near the bottom of tank 40, and immersion detection system 43 is placed near the top.

These immersion detection systems would be similar to the system shown in FIG. 7, except they would not have to compare the activity to a premeasured curve as was developed to determine the value of the percentage of air, or other parameter, in a specified liquid. In the system shown in FIG. 8, the activity would be either relatively large, as indicated by Curve 20 of FIG. 4, or relatively small as indicated by Curve 21. For the level of liquid 41 shown in FIG. 8, immersion detection system 42 is submerged, so its transducer would have a relatively low value of activity, and immersion detection system 43 is in the air, so its transducer would have a relatively high value of activity. Since this difference in activity would be large regardless of the type of liquid, the immersion detection system could be designed to operate for virtually all liquids. If fluid is removed from tank 40, the level of the liquid will drop until it falls below immersion detection system 42, and the activity of its transducer will then become relatively high. When this occurs, the system would detect the relatively large increase in activity and could then produce an output, such as an alert that indicates that Tank 40 is almost empty and needs to be refilled, or one that sends a signal that automatically starts the refilling process. When the level of liquid 41 rises high enough to submerge immersion detection system 43, the activity of its transducer will become relatively low. It could then produce an output such as an alert that indicates that Tank 40 is almost full, or one that sends a signal that automatically stops the filling of the tank. Because this type of immersion detection system requires recognizing only the difference between a relatively high value of activity or a relatively low value of activity of the transducer, it does not require premeasured curves of activity or other parameters as a function of a physical property value for different specific liquids. It will therefore work for virtually all types of liquids.

Placement of Electroacoustic Transducer in a Concrete Truck

Figure 9:
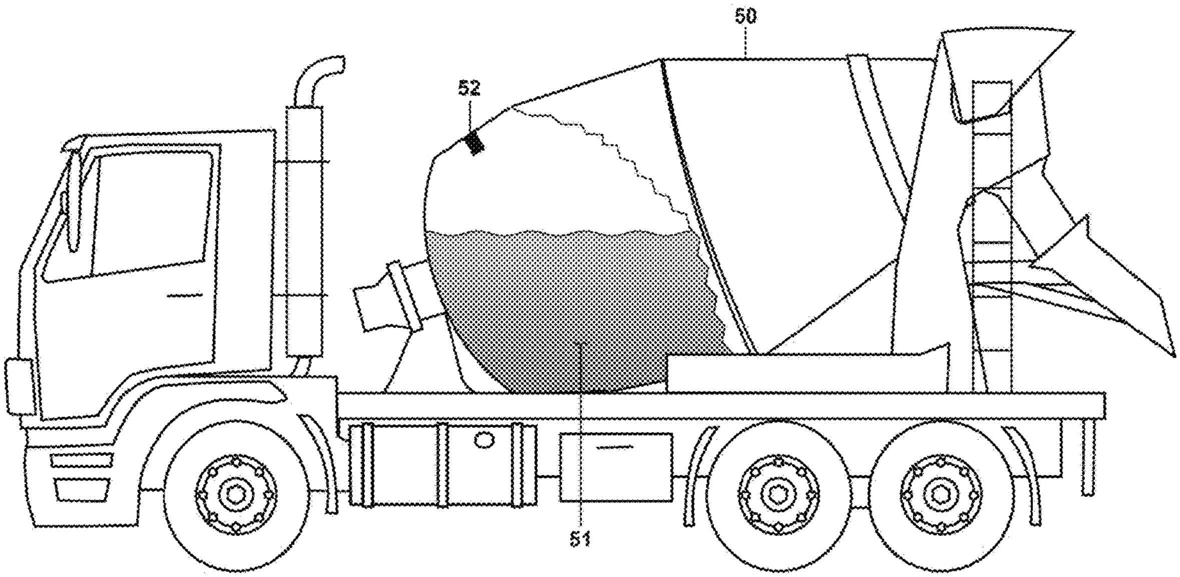
FIG. 9 is an illustration of the exemplary electroacoustic monitoring system of FIG. 8 mounted inside a concrete delivery truck. As the mixing container containing the concrete rotates, the system can determine when the transducer is immersed in the concrete and when it is in the air above the concrete. The system will compute the level of the concrete in the truck, and can also determine the percentage of air in the concrete while the transducer is immersed. The percentage of air in the concrete can then be communicated in real-time to control systems on the truck that can perform some action based on this information.

There are several embodiments of the inventive system that are applicable to concrete mixing and delivery trucks. FIG. 9 contains an illustration of a typical such truck. The mixing container 50 is located on the back of the truck. The illustration contains a cutaway section showing the concrete 51 inside the container. Mixing container 50 spins about its axis during operation, rotating in one direction so that the Archimedes screw along its axis (not shown) will continually mix the concrete during travel to the worksite, and rotated in the opposite direction when it is decided to have the Archimedes screw unload the concrete from the truck. In some trucks, two sets of Archimedes screws exist. An electroacoustic monitoring system 52 is mounted onto the inside surface of mixing container 50. As the mixing container 50 rotates, the monitoring system will be submerged in the concrete 51 for a portion of the time during each rotation, and it will be in the air space above the concrete for the rest of the time. In the illustration of FIG. 9, the electroacoustic monitoring system 52 is shown at its highest position during a rotation.

While FIG. 9 shows one placement of the electroacoustic monitoring system 52, other embodiments are also possible. For example, the electroacoustic monitoring system 52 may be installed on the lower half of the drum, preferably on the drum hatch (which is used to access the concrete drum for maintenance). In certain embodiments, one or more electroacoustic monitoring systems 52 may be installed on the hatch. In another embodiment, one electroacoustic monitoring system 52 may be installed on the hatch and a second system may be disposed on the opposite side of the drum. In yet another embodiment, an electroacoustic monitoring system 52 may be installed in the chute of the concrete truck so as to measure the air content as the concrete is being poured.

Mounting on the hatch allows for easy maintenance, but moreover, it is in a location that is utilized for even low volumes of concrete (e.g. less than 3 cubic yards). Furthermore, mixing in the lower half provides a place where the concrete is sufficiently mixed, and is relatively clean of buildup, especially if the truck is parked "hatch-up" when not in use.

When installed in the drum, a faceplate may be placed over the radiating surface 11 of the vibrating piston 10 in order to minimize abrasion. This faceplate is acoustically coupled to the liquid being measured and the radiating surface.

Electroacoustic monitoring system 52 could be a complete monitoring system as shown in FIG. 7 that can continually measure the percentage of air, or some other property, in the concrete, while it is submerged, or it could be only an immersion detection system 43 as shown in FIG. 8. As the mixing container 50 in FIG. 9 rotates, the electroacoustic monitoring system 52 will be able to detect when it submerges into the concrete, because the activity of the transducer will become relatively small, and when it emerges into the air, because the transducer's activity will become relatively large. If it is a complete monitoring system, it will be able to measure the percentage of air, or some other property, in the concrete 51 when it is submerged. This information can then be transmitted to a responsible person, such as the driver, a plant manager, or a job manager, or to other systems on the truck that are capable of performing some action, such as adding chemicals to the concrete 51 in order to control its properties, as will be explained later in this application.

Since the mechanical dimensions of the inside of mixing container 50 are known, whether the electroacoustic monitoring system 52 is a complete monitoring system or only an immersion detection system, by detecting when the system submerges and when it enters the air on reach rotation, it will be able to calculate both the level and the volume of the concrete 51 in mixing container 50.

Standalone Device

While in certain embodiments, the transducer may be disposed in a concrete mixing truck or other device, the transducer may be used as part of a standalone sensor. The standalone sensor, which may have an independent microprocessor, can calculate an air content value at a given time, such as every 5 minutes. Alternatively, it can calculate an air content value at certain events, such as when the mixer arrives at the jobsite. This value can then be reported directly, or passed to another system. For example, the air content value can be transferred to a larger database that may exist in the cloud. The air content value could also be passed to another microprocessor that manages a second, independent sensor suite. For example, this second sensor suite could include an accelerometer. In this case, the air content value may be passed at a higher frequency, but based on readings from the accelerometer, the air value may only be recorded or passed to the cloud at certain drum angles (e.g. angles where the sensor is fully submerged in the concrete). Similarly, the accelerometer readings could be used to turn the air sensor on and off to save on power consumption (e.g. at certain positions or after a certain number of revolutions). Alternatively, the sensor can be part of a sensor suite to take advantage of both a single processor and to better manage the power consumption.

Electrical Connections for the Electroacoustic Transducer System

In certain embodiments, the electroacoustic monitoring system 52 of FIG. 9 may be hardwired, with power supplied via one or more wires and the output 35 from the detection logic 34 of FIG. 7 transmitted via wires. In other embodiments, the electroacoustic monitoring system 52 may further include a wireless network controller, so that the results of the electroacoustic monitoring system 52 may be transmitted wirelessly to another component or system. For example, the electroacoustic monitoring system 52 may utilize a wireless protocol, such as WiFi, Zigbee, Bluetooth, infrared, Thread, LoRa, and others.

Application of the Electroacoustic Transducer System

As described above, the electroacoustic monitoring system 52 may be used as an immersion detection system. In this embodiment, one or more electroacoustic monitoring systems 52 are disposed in the wall of the drum of the concrete mixing truck. The position of these electroacoustic monitoring systems 52 is known and may be correlated to a specific angle of rotation. In this embodiment, the activity or another parameter of the transducer is monitored as the drum rotates. The activity of the transducer, when monitored for an entire rotation of the drum, may approximate a square wave. In other words, when the transducer is immersed in the concrete, the activity of the transducer is low, while the activity is high when the transducer is not in the concrete. By monitoring the duty cycle of this square wave (over time), it is possible to determine the level of concrete in the drum. In other words, the fraction of time at which the sensor is submerged can be related to the level of concrete in the drum from either geometric considerations or through empirical means as described in WO2019/032820, which is incorporated by reference in its entirety. Of course, other methods may also be used. For example, accelerometers or rotational encoders may be used to determine the rotational angle of the drum when the transducer is immersed in concrete. The rotational angle at which the transducer becomes immersed in the concrete and the rotational angle at which the transducer leaves the concrete may also be used to determine the volume of concrete in the drum.

Figure 11:
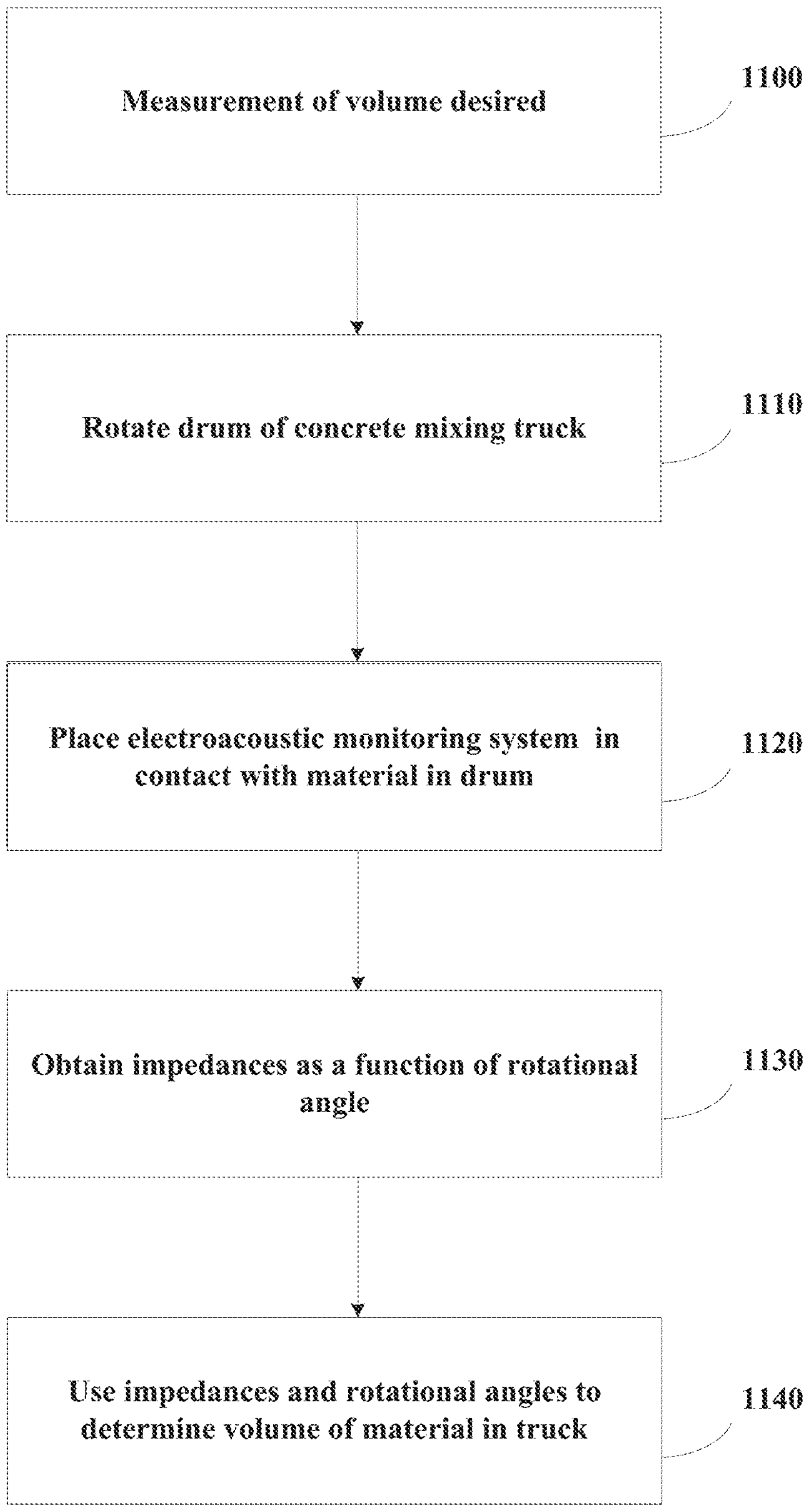
FIG. 11 shows an exemplary sequence for determining the volume of a material in a concrete mixing truck.

FIG. 11 shows a sequence of processes that may be performed to determine the volume of a material within the concrete mixing truck. This material may be concrete. In other embodiment, this material may be grey water. Grey water is defined as the water remaining after rinsing out the previous load of concrete from the concrete mixer drum (the water being grey as it still contains residual cement paste).

First, as shown in Process 1100, a measure of concrete volume is desired. As shown in Process 1110, the drum of the concrete mixing truck is rotated, preferably at a constant angular speed. Additionally, the electroacoustic monitoring system 52 is placed in contact with the material, as shown in Process 1120. Subsequently, as shown in Process 1130, the electroacoustic monitoring system 52 begins obtaining air content values as a function of rotational angle. This sequence used to determine air content values is shown in FIG. 10. The air content values and the corresponding rotational angles are then used to determine a volume within the concrete mixing truck, as shown in Process 1140. In another embodiment, the measurements of air content may be plotted against time. This plot may be relatively close to a series of pulses, where there are period of low air content and periods of high air content. The duty cycle of this plot may be used to determine the volume of material. This volume can be determined using any of the methods described above.

In certain embodiments, the electroacoustic monitoring system 52 may be used to measure grey water using the techniques described in WO2019/032820.

In another embodiment, the electroacoustic monitoring system 52 is used to monitor an amount of air in the concrete. In certain embodiments, the electroacoustic monitoring system 52 monitors the air content continuously. In other embodiments, the air content is monitored intermittently, so as to reduce power consumption. Further, in certain embodiments, the measurements are conducted at specific times during the delivery process. For example, the air content may be first measured after loading. It may be measured again upon arrival at the work site. It may also be measured at the time of discharge. Of course, the air content can be monitored at other times as well.

Figure 12:
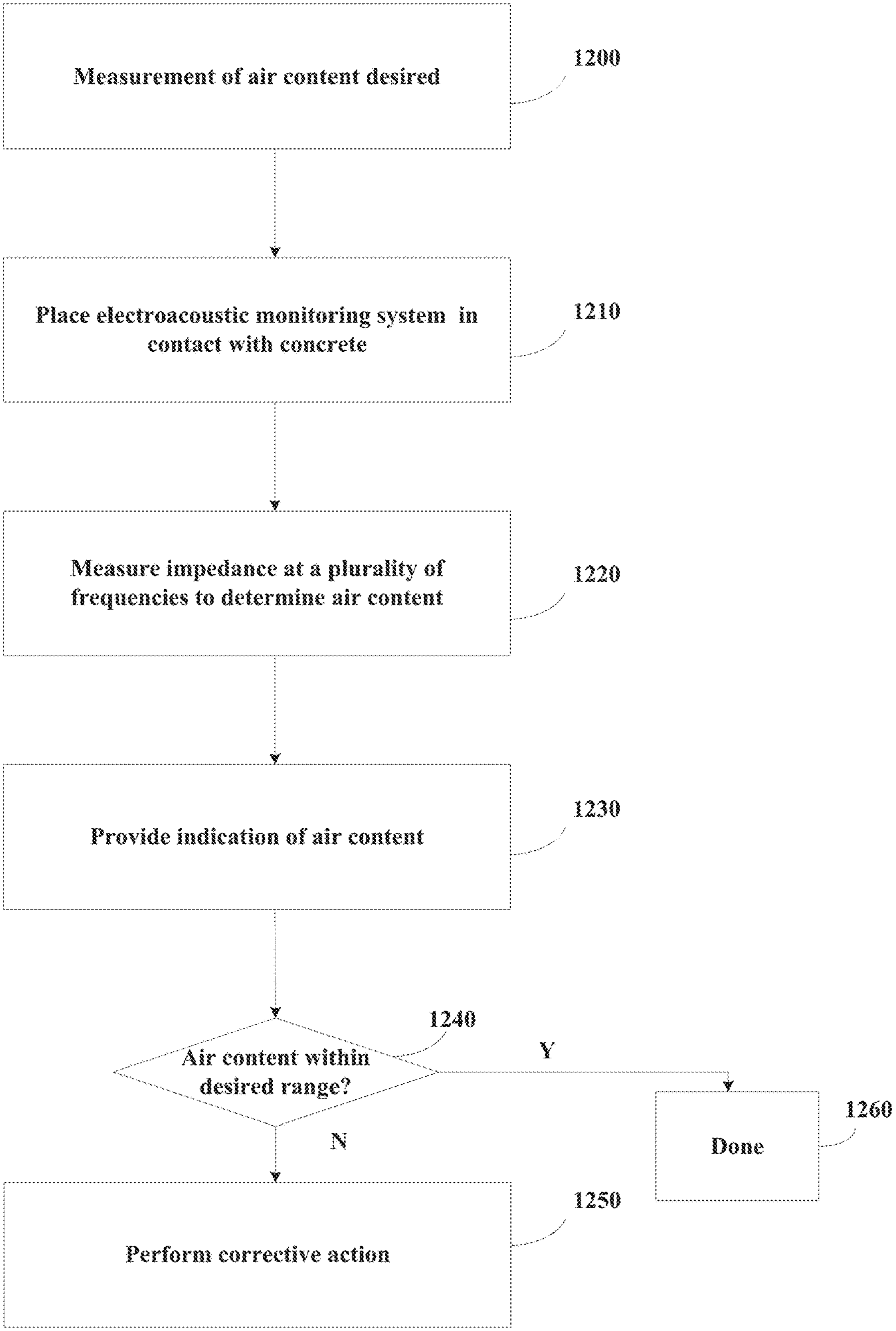
FIG. 12 shows an exemplary sequence for determining the air content in a concrete mixing truck and responding to that determination.

FIG. 12 shows a sequence of processes that may be performed to determine and adjust the air content of concrete within the concrete mixing truck. First, as shown in Process 1200, a measure of the air content is desired. In response, as shown in Process 1210, the electroacoustic monitoring system 52 is placed in contact with the concrete or other cementitious fluid. Then, as shown in Process 1220, the electroacoustic monitoring system 52 begins obtaining air content values. This sequence used to determine air content values is shown in FIG. 10. One or more measurements of air content may be performed. The measured air content may be provided to a processor on the truck, as shown in Process 1230. This may be provided via a visual display, a gauge or other indicator. It may also be provided to a responsible person, such as to a plant operator from where the concrete originated, a quality control manager, to a jobsite manager where the concrete placed or to an inspector which is overseeing the concrete being placed. It also may be provided to the operator of the truck, or a processor on a cloud-computing server where further calculations and analyses can be conducted. The resultant air content value is then compared to a desired value to determine if corrective action is required, as shown in Process 1240. If the resultant air content value is outside of the desired range, one or more corrective actions may be taken, as shown in Process 1250. These corrective actions may include:

(i) introducing into the cementitious fluid an air entraining admixture, air detraining admixture, or mixture thereof to adjust air content;

(ii) providing an indication to alert a responsible person that air entraining admixture, air detraining admixture, or mixture thereof may be mixed into the cementitious fluid to adjust its air content;

(iii) adjusting the mixing speed of the drum, as higher mixing speeds typically increase air content;

(iv) alerting the operator or jobsite manager that the concrete may be better suited to be placed in a different location where air content is not critical;

(v) adjusting the mixture to a subsequent truckload of concrete; or (vi) a combination thereof.

As stated above, the responsible person may include, for example, a plant manager (where the concrete is produced), a quality control manager (overseeing the quality during the production of the concrete and delivery to the jobsite), a contractor or jobsite manager (in charge of placing the concrete) or an inspector overseeing the concrete being placed).

If the mixture to a subsequent truck load of concrete is to be adjusted, mixture proportions such as water content, cement content, sand content, stone content, admixture content (e.g. air entrainer, air detrainer, water reducers), material types can also be replaced such as the air entrainer type or cement type.

If the air content is within specification, the sequence is complete, as shown in Process 1260. In certain embodiments, a certification or other document that confirms that the air content was within specification may be created.

In some embodiments, the electroacoustic monitoring system 52 is used to measure at least two of the following parameters: the volume of concrete in the concrete mixing truck; the volume of grey water in the concrete mixing truck; and the air content of concrete in the concrete mixing truck.

Further, while the description above describes sweeping the output across many frequencies, other embodiments are also possible. For example, in the examples described in FIGS. 4, 5 and 6, the impedance at only one or two frequencies is required. Thus, in certain embodiments, the electroacoustic transducer may be calibrated so as to determine its resonance and anti-resonance frequencies. Thereafter, rather than sweeping a range of frequencies, the impedance measurements may be performed at exactly these two frequencies.

The invention is illustrated by the following enumerated example embodiments, including various exemplary aspects within the enumerated example embodiments.

In a first example embodiment, a method for measuring air within a cementitious fluid is disclosed. The method comprises:

(A) placing into contact with a cementitious fluid having an entrapped or entrained air content at least one electro-acoustic transducer comprising a radiating surface that transmits an acoustic wave within the fluid as the transducer is supplied an electrical signal;

(B) measuring an impedance of the transducer while its radiating surface is in contact with the cementitious fluid and while it is supplied a frequency varying electrical signal, and obtaining impedance values at corresponding frequencies;

(C) using obtained impedance value or values to obtain an air content value; and (D) initiating at least one of the following actions:

(i) an indication of the air content within the cementitious fluid;

(ii) an indication (e.g., alarm, audible or visual warning) that the air content within the cementitious fluid is outside a predetermined range;

(iii) a corrective action to adjust the air content if the air content is outside a predetermined range; or (iv) a combination thereof.

In a first aspect of the first example embodiment, the corrective action is selected from the group consisting of:

(i) introducing into the cementitious fluid an air entraining admixture, air detraining admixture, or mixture thereof to adjust air content;

(ii) providing an indication to alert a responsible person (e.g. plant manager, quality control manager, contractor, jobsite manager, inspector) that air entraining admixture, air detraining admixture, or mixture thereof may be mixed into the cementitious fluid to adjust its air content;

(iii) adjusting the mixing speed of the drum, as higher mixing speeds typically increase air content;

(iv) alerting the operator or contractor or both that the concrete may be better suited to be placed in a different location where air content is not critical;

(v) adjusting the mixture to a subsequent truckload of concrete; or (vi) a combination thereof.

In a second aspect of the first example embodiment, a certificate or documentation is created if the air content is within the desired range.

In a third aspect of the first example embodiment, the impedance values are measured while performing a frequency sweep; where the frequency sweep comprising a monotonic change in frequencies spanning at least two distinct frequencies. In a further aspect, the two distinct frequencies over which the frequency sweep occurs is based on the composition of the cementitious fluid, the slump of the cementitious fluid, or a combination thereof.

In a fourth aspect of the first example embodiment, the obtained air contents are based on the mix composition of the cementitious fluid, the slump of the cementitious fluid, or combinations thereof.

In a fifth aspect of the first example embodiment, the impedance is recorded for at least one of the resonant and anti-resonant frequencies of the electroacoustic transducer while in contact with the cementitious fluid. In another aspect, the impedance may be recorded for both the resonant and anti-resonant frequencies.

In a sixth aspect of the first example embodiment, the cementitious fluid is disposed in a mixer, the mixer comprising an open-end drum rotating about a non-vertical axis with at least one blade spirally-mounted on the inner wall for agitating or mixing the suspension during mixer drum rotation, and the electroacoustic transducer is mounted on the interior of the drum.

In a seventh aspect of the first example embodiment, the cementitious fluid is disposed in a stationary mixer such as a pan mix, twin shaft mixer, or planetary mixer (as used in a precast plant), and the electroacoustic transducer is mounted on the interior of the stationary mixer.

In a second example embodiment, which may be based upon the first example embodiment above, a method for measuring an amount of cementitious material in a concrete mixing truck is disclosed. The method comprises:

(A) placing into contact with the cementitious material at least one electro-acoustic transducer comprising a radiating surface that transmits an acoustic wave within the cementitious material as the transducer is supplied an electrical signal;

(B) rotating the drum of the concrete mixing truck while measuring (i) an impedance of the transducer while its radiating surface is in contact with the cementitious material and while it is supplied a frequency varying electrical signal, and (ii) obtaining impedance values at corresponding frequencies; and rotational angle, time values or both corresponding to the impedance values;

(C) using the impedance values and the corresponding rotational angles, time values or both to determine a volume of cementitious material in the concrete mixing truck.

In a first aspect of the second example embodiment, the cementitious material is concrete.

In a second aspect of the second example embodiment, the cementitious material is grey water.

In a third example embodiment, which may be based upon any of the first through second example embodiments above, an apparatus for preparing a cementitious fluid is disclosed. The apparatus comprises:

a mixer having a drum;

an electroacoustic transducer mounted on the interior of the drum;

an electrical source for providing a frequency varying signal to the electroacoustic transducer;

an impedometer; and
a controller.

In a first aspect of the third example embodiment, the mixer comprises an open-end drum rotating about a non-vertical axis with at least one blade spirally-mounted on the inner wall for agitating or mixing the suspension during mixer drum rotation.

In a second aspect of the third example embodiment, the mixer comprises a stationary pan mixer, a stationary twin shaft mixer, or a stationary planetary mixer.

In a third aspect of the third example embodiment, an impedance is measured at one or more frequencies while the electroacoustic transducer is in contact with the cementitious material and the controller converts the impedance value into a parameter associated with the cementitious fluid. In certain aspects, the parameter is air content.

In a fourth aspect of the third example embodiment, an impedance is measured at one or more frequencies while the drum is rotating and the controller determines a volume of cementitious fluid in the drum based on the impedance measured during a rotation. The calculation of the volume can further include a rotational angle measurement or a duty cycle measurement (i.e. fraction of a revolution or time that the sensor is submerged versus not submerged).

In a fourth example embodiment, which may be based upon any of the first through third example embodiments above, an apparatus for monitoring the value and change in value of at least one specific physical property of a liquid is provided, where the property is characterized in that changes in the property have a direct effect on the acoustic radiation load on an electroacoustic transducer contained in the apparatus over a predetermined frequency band. The transducer contains a radiating surface and the apparatus is further characterized in that it contains mounting means that holds said radiating surface in contact with and acoustically coupled to the liquid and electronic measuring means characterized in that it can measure an electrical parameter such as the electrical impedance or admittance of the transducer over the predetermined frequency, the electronic measuring means further characterized in that it can compare the measured values of the transducer's electrical parameter over the predetermined frequency band to a previously determined relationship over the frequency band between this electrical parameter and the value of the physical property being measured, and it can then determine the value of said physical property being monitored.

In a fifth example embodiment, which may be based upon any of the first through fourth example embodiments above, apparatus for monitoring at least one physical property of a liquid is provided. The apparatus comprises:

an electroacoustic transducer including:
- at least one electroacoustic transducer element,
  - an electrical connection to the transducer element, said transducer element having an electroacoustic radiating surface that can be placed in contact with and acoustically coupled to the liquid, and
  - wherein the electroacoustic transducer exhibits an electrical sensitivity that causes an electrical characteristic of the transducer to vary as a function of the physical property of the liquid while the liquid is in contact with the radiating surface, a signal source operatively connected to the electrical connection, and a measurement circuit operatively connected to the electrical connection of the transduction element to derive information about the physical property based on signals from the signal source and the electrical characteristic of the transducer element.

In a first aspect of the fifth example embodiment, the electroacoustic transducer element has at least one resonant and antiresonant frequency and wherein the measurement circuit is operative to apply electrical signals to the electroacoustic transducer element in the frequency region that includes the fundamental resonant and antiresonant frequencies.

In a second aspect of the fifth example embodiment, the measurement circuit is operative to apply electrical signals to the electroacoustic transducer element that include a plurality of different frequencies. In a further aspect, the electroacoustic transducer element has at least one resonant and antiresonant frequency and wherein the measurement circuit is operative to apply electrical signals to the electroacoustic transducer element over a range of frequencies that includes the resonant and antiresonant frequencies. In a second further aspect, wherein the measurement circuit is operative to determine an activity measure for the liquid based on measurements made at the different frequencies.

In a third aspect of the fifth example embodiment, the transducer element includes an electrostrictive ceramic material.

In a fourth aspect of the fifth example embodiment, the electroacoustic transducer element is an ultrasonic transducer.

In a fifth aspect of the fifth example embodiment, the measurement circuit is operative to measure impedance, admittance or both.

In a sixth aspect of the fifth example embodiment, the apparatus is constructed and adapted to derive a measure of air content in the liquid.

In a seventh aspect of the fifth example embodiment, the measurement circuit includes an impedometer and detection logic.

In an eighth aspect of the fifth example embodiment, the measurement circuit includes liquid detection logic operative to provide an indication of the presence or absence of a liquid in contact with the electroacoustic radiating surface.

In a ninth aspect of the fifth example embodiment, the transducer element is cylindrical.

In a tenth aspect of the fifth example embodiment, the apparatus further includes a mounting mechanism to mount the apparatus, wherein the mounting mechanism includes a transducer interface to hold the transducer element and a mounting surface to hold the apparatus in place.

In an eleventh aspect of the fifth example embodiment, the apparatus further includes a housing or housings that include surface portions that cover and encapsulate the transducer element, the measurement circuit or both.

In a sixth example embodiment, which may be based upon any of the first through fifth example embodiments above, an apparatus for monitoring a physical property of a liquid is provided. The apparatus comprises:

means for contacting the liquid, means for applying a measurement signal to the means for contacting, and means for measuring changes in properties of a liquid in contact with the means for contacting based on the applied measurement signal.

In a seventh example embodiment, which may be based upon any of the first through sixth example embodiments above, a method for monitoring at least one physical property of a non-cementitious liquid is provided. The method comprises:

providing a radiation surface of an electroacoustic transducer in contact with the non-cementitious liquid, applying a measurement signal to the electroacoustic transducer, and measuring an electrical property of the electroacoustic transducer that is sensitive to the physical property of the non-cementitious liquid based on the applied measurement signal.

In a first aspect of the seventh example embodiment, the measuring takes an average of a plurality of measurements.

In a second aspect of the seventh example embodiment, the measuring includes deriving an indication of the presence or absence of the non-cementitious liquid at the radiation surface from the measuring.

In a third aspect of the seventh example embodiment, the measuring includes deriving an indication of a volume of the non-cementitious liquid at the radiation surface from the measuring.

In a fourth aspect of the seventh example embodiment, the measuring includes deriving a physical property of the non-cementitious liquid at the radiation surface from the measuring.

In a fifth aspect of the seventh example embodiment, the measuring includes deriving an air content value for the non-cementitious liquid at the radiation surface from the measuring.

In an eighth example embodiment, which may be based upon any of the first through seventh example embodiments above, a method for monitoring at least one physical property of a cementitious liquid is provided. The method comprises:

providing a radiation surface of an electroacoustic transducer in contact with the cementitious liquid, applying a measurement signal to the electroacoustic transducer, and measuring an electrical property of the electroacoustic transducer that is sensitive to the physical property of the cementitious liquid based on the applied measurement signal.

In a first aspect of the eighth example embodiment, the measuring includes deriving an indication of the presence or absence of the cementitious liquid at the radiation surface from the measuring.

In a second aspect of the eighth example embodiment, the measuring includes deriving an indication of a volume of the cementitious liquid at the radiation surface from the measuring.

In a third aspect of the eighth example embodiment, the measuring includes deriving a physical property of the cementitious liquid at the radiation surface from the measuring.

In a fourth aspect of the eighth example embodiment, the measuring includes deriving an air content value for the cementitious liquid at the radiation surface from the measuring.

While there have been shown and described several specific embodiments of the present invention, it will of course be understood that various modifications and alternative constructions may be made without departing from the true spirit and scope of the invention. Therefore, the intended claims are intended to cover all such modifications and alternative constructions as fall within their true spirit and scope.

We claim:

1. A method for measuring an amount of cementitious material in a concrete mixing truck, comprising:

(A) placing into contact with the cementitious material at least one electroacoustic transducer comprising a radiating surface that contacts the cementitious material and transmits an acoustic wave as the electroacoustic transducer is supplied an electrical signal, said electroacoustic transducer having a resonant frequency $f_r$ and an antiresonant frequency $f_a$, said electroacoustic transducer being connected to an electronic circuit configured to measure the magnitude of driving point impedance of the electroacoustic transducer at its resonance frequency $f_r$ and its antiresonant frequency $f_a$ and calculate activity of the electroacoustic transducer;

(B) rotating a drum of the concrete mixing truck so that said radiating surface of said electroacoustic transducer submerges in and then emerges from said cementitious material while measuring with said electronic circuit the driving point impedance magnitude of $f_r$ and $f_a$, and calculating the activity of said electroacoustic transducer a plurality of times as said drum rotates; and (C) using the calculated activities and the corresponding rotational angles, time values or both to determine a volume of cementitious material in the concrete mixing truck.

2. The method of claim 1, wherein the cementitious material is concrete.

3. The method of claim 1, wherein the cementitious material is grey water.

4. A method for measuring an amount of cementitious material in a concrete mixing truck, comprising:

(A) providing at least one electroacoustic transducer comprising a radiating surface inside a drum of the concrete mixing truck and applying an excitation signal to said at least one electroacoustic transducer wherein the frequency of said excitation signal is in a range that includes both a resonant and anti-resonant frequency of said electroacoustic transducer;

(B) obtaining electroacoustic impedance magnitudes from the electroacoustic transducer in a frequency band that includes at least one of the resonant or anti-resonant frequency of the electroacoustic transducer as the drum rotates to detect when the electroacoustic transducer is immersed in the cementitious material or not; and (C) obtaining a detected amount of cementitious material from the obtained impedances.

* * * * *